Nov. 4, 1924.    1,513,728
W. G. ALLAN
ELECTRODE STRUCTURE AND METHOD OF MANUFACTURING SAME
Filed Sept. 2, 1920    3 Sheets-Sheet 1
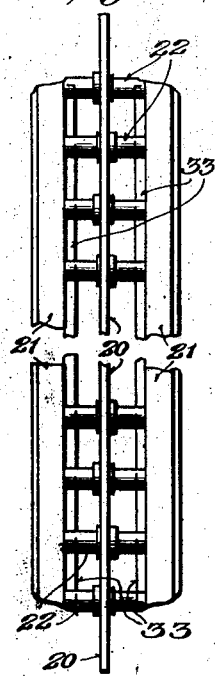
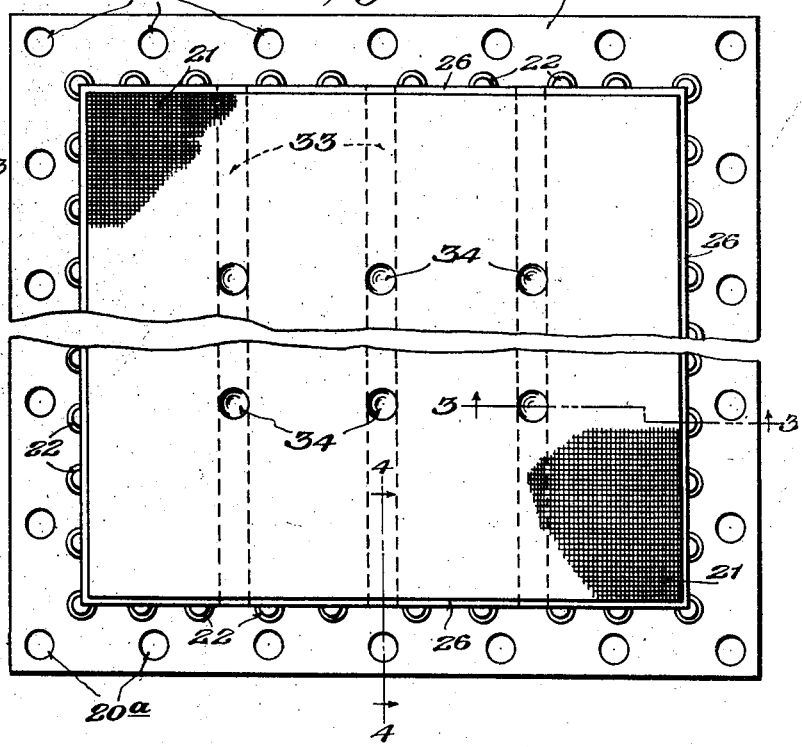
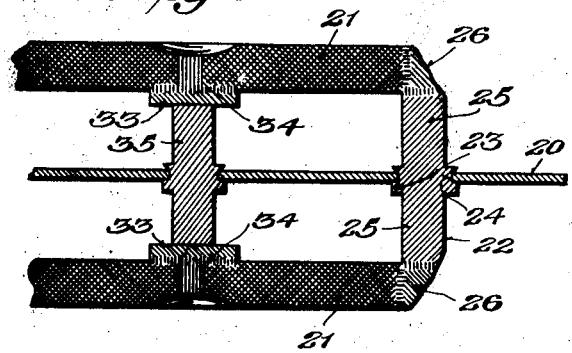
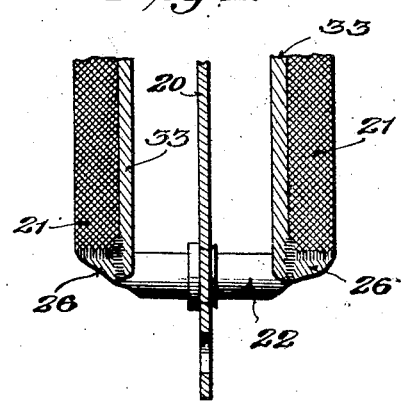
Inventor
William G. Allan,
By
Attorney

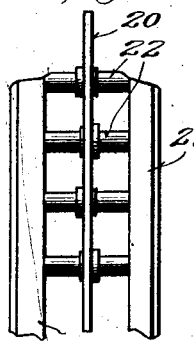
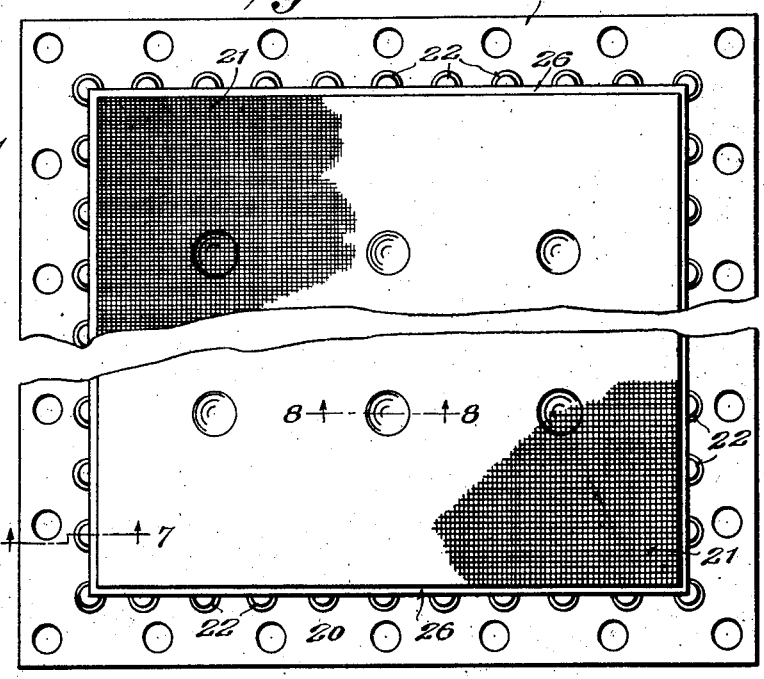
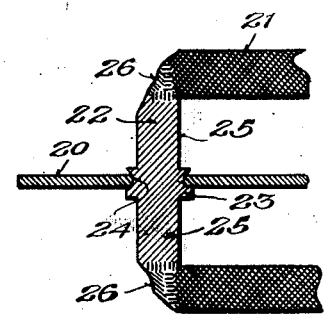
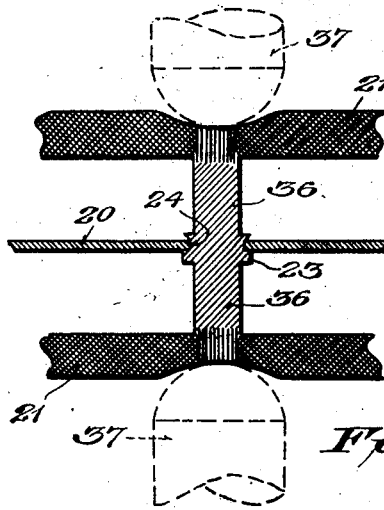

Nov. 4, 1924.                                                 1,513,728
W. G. ALLAN
ELECTRODE STRUCTURE AND METHOD OF MANUFACTURING SAME
Filed Sept. 2, 1920          3 Sheets-Sheet 3
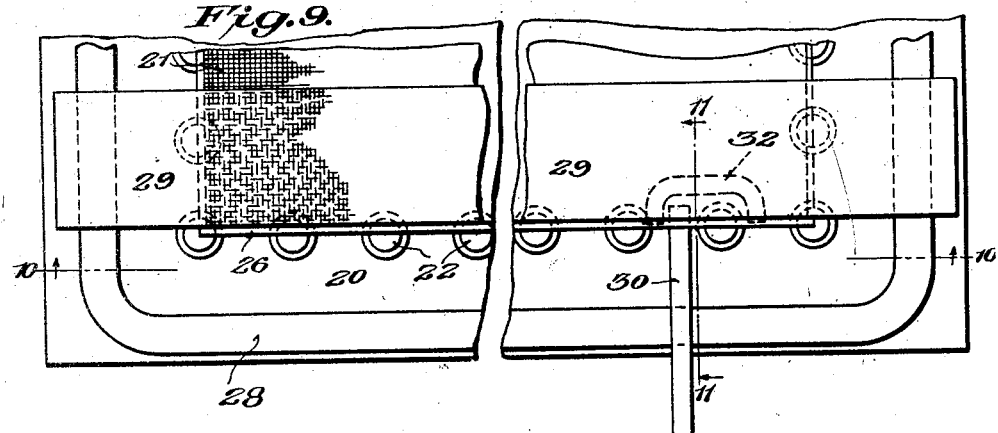
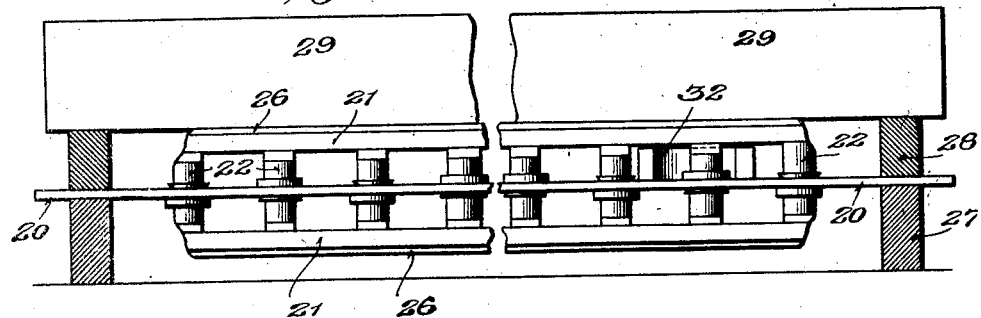
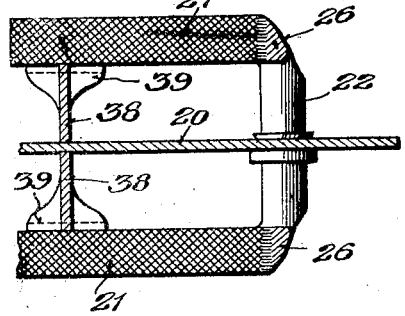
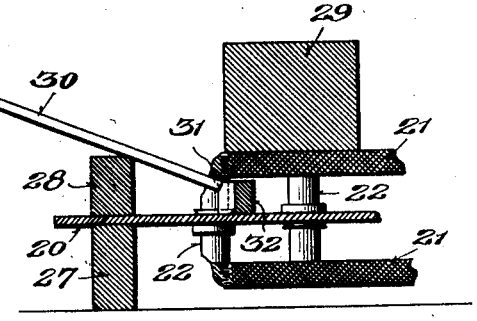
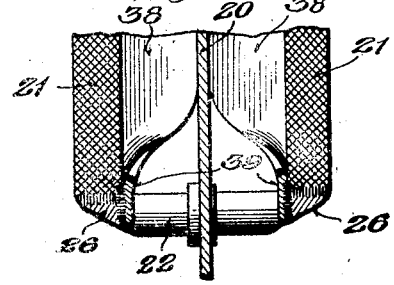
INVENTOR
William G. Allan,
by R. A. Seward
ATTORNEY Patented Nov. 4, 1924.

1,513,728

UNITED STATES PATENT OFFICE.

WILLIAM G. ALLAN, OF TORONTO, ONTARIO, CANADA, ASSIGNOR, BY MESNE ASSIGNMENTS, TO JOHN P. SCOTT, OF TORONTO, CANADA.

ELECTRODE STRUCTURE AND METHOD OF MANUFACTURING SAME.

Application filed September 2, 1920. Serial No. 407,637.

*To all whom it may concern:*

Be it known that I, WILLIAM G. ALLAN, a subject of the King of Great Britain, residing at Toronto, county of York, Province of Ontario, Canada, have invented certain new and useful Improvements in Electrode Structures and Methods of Manufacturing Same; and I do hereby declare the following to be a full, clear, and exact description of the invention, such as will enable others skilled in the art to which it appertains to make and use the same.

This invention relates to electrode structures and methods of manufacturing same; and it has to do more particularly with the manufacture of electrodes of especial utility in the art of generating oxygen and hydrogen by electrolytic decomposition of water.

In certain types of electrolyzers employed for the production of oxygen and hydrogen, and particularly in the so-called filter press type, it is important that provision be made for securing ready circulation of the electrolyte through the cell or cells of the generator and also to enable ready disengagement of generated gases from the electrode surfaces so that said gases may leave the electrode surfaces promptly and pass off with the circulating electrolyte. In the absence of such provision, polarization occurs and the efficiency of the generator is much reduced. It is also important that the cooperating active electrodes of each cell couple be maintained as close together as practicable in order to reduce the internal resistance to a minimum and thus further to ensure efficiency in operation. It is also essential that the active surfaces of the cooperating electrodes of a couple be maintained as accurately parallel as possible in order to prevent uneven distribution of the electrolyzing current over the active electrode surfaces. The foregoing considerations are of especial weight where high current densities are employed, for example, current densities of as much as one ampere per square inch or higher.

A principal object of the present invention is therefore to provide an electrode structure that will meet the foregoing requirements in a practical manner; and a further object of the invention is to provide a method of manufacturing such electrode structure accurately and economically.

With the above general objects in view and some others which will become apparent as the description proceeds, the invention consists in the features, details of construction and combinations of parts, which will first be described in connection with typical practical embodiments of the invention illustrated in the accompanying drawings and will then be more particularly pointed out.

Generally described, the electrode structure of the invention comprises a foraminous active electrode member mounted upon a backing or supporting plate in spaced parallel relation thereto, the character of the mounting means for the active electrode member being such as to permit unrestricted passage of electrolyte and envolved gas between said active electrode member and its backing plate. Electrode structures of this general type have been devised heretofore by me, but the construction to be hereinafter described embodies certain advantageous features of great practical importance. These improved features relate more particularly to the character and arrangement of the mounting means for the active electrode member, and the manner of securing said electrode member to said mounting means. In general, the electrode structure of the present invention comprises a flat foraminous active electrode member having its periphery anchored as by welding to the ends of studs or pins which are secured at intervals in any suitable manner to the electrode supporting or backing plate.

In the accompanying drawings,

Figs. 1 and 2 are front and edge views, respectively, of an electrode structure embodying the principles of the invention;

Figs. 3 and 4 are fragmentary sections on an enlarged scale, taken on the lines 3—3 and 4—4, respectively, of Fig. 1;

Figs. 5 and 6 are front and edge views, respectively, of a slightly different electrode construction within the scope of the invention;

Figs. 7 and 8 are fragmentary sections on an enlarged scale taken on the lines 7—7 and 8—8, respectively, of Fig. 5, Fig. 8 further illustrating diagrammatically a step in the method of manufacture.

Figs. 9, 10 and 11 are views representing more or less diagrammatically the method of manufacture, Fig. 9 being a partial top plan view of a jig device with an electrode structure therein in course of manufacture; Fig. 10 being a view in front elevation, parts being in section, on the line 10—10 of Fig. 9, and Fig. 11 being a fragmentary transverse section on the line 11—11 of Fig. 9; and Figs. 12 and 13 are views similar to Figs. 3 and 4, respectively, illustrating another construction within the invention.

Referring to the drawings, 20 represents an electrode supporting or backing plate, supporting a pair of active electrode members 21 on opposite sides thereof, said electrode members being carried by stud devices 22 extending through apertures provided in said backing plate and secured to said plate in any suitable manner. In the construction illustrated, each stud device has a shoulder or flange 23 adapted to abut one side of the plate 20, and for a short distance adjacent said shoulder, as indicated at 24, the stud device is of slightly greater diameter than the oppositely extending stud shanks 25. The thickened section 24 is of slightly greater extent than the thickness of plate 20 so that when the shoulder 23 abuts one side of the plate, the thickened section may be peened over slightly, as shown, by means of a suitable riveting or calking tool to anchor the stud device firmly in position on the supporting plate, with the shank portions 25 extending perpendicularly therefrom on both sides.

As shown, the successive studs of each row are most desirably inserted alternately from opposite sides of the backing plate. This tends to prevent warping of the plate which is otherwise sometimes likely to occur when the plate is relatively thin. Other expedients for preventing such warping may be resorted to, however, within the broad scope of the invention.

The structure here chosen for purposes of illustration is a bipolar electrode, but it will be understood that the principles of the invention also apply to unipolar electrodes, and that in the case of a unipolar electrode one of the shank portions 25 of each stud device is omitted. Moreover, welding or some other suitable method may be used in securing the mounting stud devices in position on the backing plate, instead of employing the method herein disclosed.

The backing plate, in the case of a bipolar electrode, may be of any suitable material, either conducting or nonconducting. In practice, it is convenient to employ backing plates of relatively light gage sheet steel, the character of the complete electrode structure being such as to give the requisite rigidity, even though very light gage sheet metal be employed as the supporting member, a point of obvious importance. In any case, whether the supporting plate be conducting or non-conducting, the stud devices 22 provide a highly conductive path between the active electrode members on opposite sides of the supporting plate.

As stated, the active electrode member 21 is foraminous. In practice, a cell couple comprises two such active electrode members arranged face to face and separated by a pervious diaphragm, usually of woven asbestos fabric. The diaphragm should be as thin as possible, consistent with efficient separation of the oxygen and hydrogen generated in the anode and cathode compartments, respectively, into which the diaphragm divides the cell; and it is good practice to mount the cooperating electrode members of a couple in such manner that they substantially engage the opposite sides of the diaphragm, being thus spaced apart only by a distance equal to the thickness of the diaphragm. The foraminous character of the active electrode surfaces permits the evolved gases to escape rearwardly through the respective active electrode surfaces and to enter the free space provided between the active electrode members and their backing plates.

Within the scope of the invention, the specific character of the foraminous active electrode member may vary considerably. For example, it may consist of a single layer or ply of sufficiently heavy gage metallic wire cloth, or screen; or it may consist of a plurality of superposed layers or plies of such metallic wire fabric. In any case it is desirable that the foraminous electrode member be marginally supported by and anchored to the mounting means, in this instance the studs 22, in such manner as to maintain the front surface of the electrode member substantially plane, and to hold it as rigidly and permanently as possible in this position, so that when the electrode structure is assembled with a cooperating electrode structure of the same type, the electrode surfaces of the resulting couple will be accurately parallel.

I have found that this result can be best realized by holding the foraminous electrode body in a jig or other work holder in such manner as to maintain the outer surface of said electrode member accurately plane and while so holding the electrode member, to weld it marginally to the tops or outer ends of the mounting studs 22. In the best embodiment of the invention, the foraminous electrode member is preliminarily provided with a stiffening frame or border 26 integral therewith. This border may be formed in any suitable manner, and in practice may be made by fusing the marginal portion of the foraminous material about its entire periphery into the form desired. This is readily done where the active electrode member consists of a plurality of layers or plies of wire fabric and it can also be done where a single ply of sufficiently heavy gage is used.

The studs 22 having previously been anchored on the plate 20 with their centers alined to correspond to the contour of the periphery of the active electrode member, in this instance rectangular, the border 26 of said member is then welded to the top of each stud in a manner to be presently described. This welding may be accomplished electrically, or other means such as an oxy-acetylene welding torch may be used. In the practical method illustrated more or less diagrammatically in Figs. 9 to 11, the supporting plate 20, with its attached stud devices is laid on a heavy rectangular jig frame 27 of cast iron or the like, having its upper edges finished accurately plane; and other heavy jig frame 28, of similar size and character to frame 27 is then placed on top of the supporting plate, said plate being thus marginally clamped between the upper and lower frames. The vertical thickness of the upper frame 28 is exactly equal to the distance at which it is desired the plane front face of the active electrode member shall be from the adjacent face of the supporting or backing plate 20 in the finished electrode structure. The previously prepared active electrode member 21 having been set in position with its border 26 resting on the upper ends of the studs 22, a heavy gage bar 29 of cast iron or the like, having its under surface accurately plane, is then laid upon the frame 28. It will be understood that the height of the mounting studs and the thickness of the previously prepared active electrode member are so predetermined that these combined dimensions substantially equal the vertical thickness of the frame 28 as a maximum. Slight variations either above or below this exact distance at different locations are permissible and are corrected in the ensuing welding operation as will appear. As is best seen in Figs. 9 and 11, the gage bar 29 is placed approximately over that portion of the electrode periphery at which the welding is being carried on. In the actual welding operation, the electrode border 26 and the foraminous electrode material itself are maintained in firm engagement with the plane underface of the gage bar 29 by means of a lever 30 fulcrumed on the upper jig frame 28 and bearing at one end against the under-face of the electrode border as indicated at 31. Slight pressure from the operator's hand on the long arm of the lever ensures the necessary close contact of the upper surface of the electrode member with the gage bar, and with the parts thus accurately positioned, the operator may direct an oxy-acetylene flame upon the electrode border at a point just above the stud to which it is then to be welded, fusing enough of the metal of both to form a perfect weld union at this point. Should the particular stud in question be a trifle short or the border a trifle thin at this point, the welder may easily rectify this by adding metal from a welding rod of the same metal, in a manner well understood in the welding art. In order to localize the fusing action of the welding torch, a shield 32 may be employed, as shown. Furthermore, in order to prevent contact of the welding flame with the backing plate and consequent danger of warping or otherwise damaging the latter, the apparatus may be immersed in water or other suitable cooling liquid, during the welding operation, to a depth sufficient to cover the upper surface of the plate. In case one or more of the studs is a trifle high, or the electrode border slightly thicker than it should be at any of the welding points, the softening and fusing of the metal at these points ensures automatic correct alinement by reason of the weight of the superimposed heavy gage bar 29. As a result of marginally welding the electrode member to the mounting studs while the supporting plate and the front face of the electrode are maintained accurately parallel by the gage means employed, the finished electrode structure has its active electrode face accurately plane and parallel to the supporting plate; and by reason of the box-like construction of the assemblage, the structure is rigid and resists deformation. It is also found that as a result of proceeding in the manner set forth, the wire fabric of the active electrode member is noticeably tensioned, being stiffer and freer from sag than it was before its fused metal border was welded to the studs. Probably this is due to the fact that the border of the electrode member is expanded by the heat of welding and later contracts upon cooling after it is welded to the tops of the rigid studs.

In forming the active electrode member itself, the metallic wire fabric, whether single ply or multi-ply, should be firmly held or clamped between plane jig plates, enough of the margin of the material projecting beyond the plates to provide for fusing such marginal portions in the proper form to constitute the fused metal border 26. Most desirably the metal wire fabric is maintained under heavy compression between the jig plates while the fused border is being formed, especially where a plurality of superposed plies are used. The border thus formed may be ground or otherwise finished to such dimensions and form as are required. This general method of producing an electrode member and the article resulting therefrom forms the subject matter of my copending application, Ser. No. 355,988, filed February 3, 1920.

Where it is desired for any reason to further guard against sagging of the active electrode surface, especially the central portion thereof, metal strips 33 may be welded at opposite ends to the electrode border 26, their intermediate portions underlying and engaging the rear face of the active electrode member. If desired, the active electrode member may be fastened to intermediate portions of these reinforcing strips in any suitable manner as, for example, by spot welds indicated at 34. Furthermore, the strips 33 may be themselves further supported by supplemental studs 35 secured to plate 20 with their outer ends engaging the strips 33. The strips can also be weld united to said studs 35, but this is not essential. Besides acting to stiffen and back the electrode surface, as well as to space it the proper distance from the supporting plate, said strips also function to some extent as current distributers.

Another way of supporting the central portions of the active electrode member against sagging where this is deemed necessary or desirable in any given instance, is illustrated in Figs. 5 and 8 where the central portion of the active electrode member is welded to the tops or outer ends of supplemental studs 36, Fig. 8 illustrating how this can be effected by means of welding electrodes 37, in a typical example.

In the construction illustrated in Figs. 12 and 13, another form of means for supporting the intermediate portions of the electrode member is shown. Strips or bars 38, corresponding to strips 33, are arranged edgewise, to both the foraminous electrode member and the backing plate; and they may have their end portions 39 twisted into parallelism with the border 26 to facilitate welding to the latter. The strips may or may not have their opposite edges welded at intervals to the foraminous electrode member and the backing plate. The strips 38 are arranged to be vertical in actual use of the electrode, as are also the previously described strips 33, to minimize obstruction to free vertical flow of electrolyte. Strips 38 have the advantage of occupying a smaller area of the rear surface of the active electrode, thereby presenting less obstruction to rearward passage of gases through said electrode.

While certain specific embodiments of the invention have been hereinabove described for the sake of a concrete example, it will be understood that various changes can be made in the structural details and steps of procedure described without departing from the spirit and the scope of the invention. It is also to be noted that while the invention is of primary importance in connection with electrode structures, it is not necessarily restricted thereto, but is applicable generally where analogous constructions or combinations of parts are useful.

What I claim is:

1. In an electrode structure, the combination, with a substantially plane supporting plate, of metal stud devices mounted at intervals on said plate and projecting substantially perpendicularly and approximately the same distance therefrom, and a metal fabric member marginally held by a weld union to the outer ends of said stud devices.

2. In an electrode structure, the combination, with a substantially plane supporting plate, of metal stud devices mounted at intervals on said plate and projecting substantially perpendicularly and approximately the same distance therefrom, and a flat body of compacted layers of wire cloth united at their edges, such united edges being weld-united to the outer ends of said stud devices.

3. In an electrode structure, the combination, with a substantially plane supporting plate, of metal stud devices mounted at intervals on said plate and projecting substantially perpendicularly and approximately the same distance therefrom, and a flat body of compacted layers of wire cloth having their edges fused together into a bead or border, said border being welded to the outer ends of said studs.

4. In an electrode structure, the combination, with a substantially plane supporting plate, of metal stud devices mounted at intervals on said plate and projecting substantially perpendicularly and approximately the same distance therefrom, and a flat body of compacted layers of wire cloth having their edges fused together into a bead or border, said border being welded to the outer ends of said studs, and the outer periphery of said bead or border, at the points of welding to said studs, being somewhat within the outer lateral surfaces of said studs.

5. In a structure of the character described, the combination, with a suitable supporting base, of metal stud devices secured thereto, and a foraminous metal member in the form of a plate or sheet weld-united to said stud devices and spaced from the base.

6. In a structure of the character described, the combination, with a suitable supporting base, of metal stud devices secured thereto, and a laminated mass of wire fabric compacted and weld-united to said stud devices and spaced from the base.

7. In a structure of the character described, the combination, with a suitable supporting base, of metal stud devices secured thereto, and a laminated mass of wire fabric compacted into a plate-like member and provided with a stiffening border or frame welded to said stud devices and spaced from the base.

8. In a structure of the character described, the combination, with a woven metal fabric member the ends of the strands of fabric being fused into a border, metal supporting means welded to the border of said member, of supplemental supporting means engaging said member intermediate the margins thereof.

9. In a structure of the character described, the combination, with a laminated mass of wire fabric having its edges fused to form a stiffening border, of one or more reinforcing strips each fused at its ends to said border and engaging said fabric intermediate the border portions thereof.

10. In a structure of the character described, the combination, with a supporting plate, of a wire fabric member, means marginally securing the same in substantially parallel spaced relation to said plate, and one or more elongated supports underlying a portion of said fabric member intermediate its margins and terminally fastened to said member.

11. In a structure of the character described, the combination, with a supporting backing, of a foraminous sheet-like metal member, a plurality of devices attached to said backing and to said member along its margin and securing said member to said backing in parallel spaced relation, and metal strip means underlying said member centrally.

12. In a structure of the character described, the combination, with a supporting backing, of a sheet-like body of metal fabric, mounting means fixed on said backing and secured at spaced intervals to the marginal portion of said body of metal fabric and holding the same in substantially parallel spaced relation to said backing, and relatively thin strip means underlying and closely adjacent said body of fabric and secured to opposite margins thereof.

13. In a structure of the character described, the combination, with a foraminous metal sheet, a supporting plate and means marginally attaching said sheet to said plate in parallel spaced relation, of strip means underlying intermediate portions of said sheet, and studs secured to said plate and underlying said strip means to maintain them in proper spaced relation to said plate.

14. In a structure of the character described, the combination, with a foraminous metal sheet, a supporting plate, and means marginally attaching said sheet to said plate in parallel spaced relation, of one or more flat strips arranged between said sheet and plate with their edges substantially engaging both said sheet and plate, the end portions of said strip or strips being twisted substantially into parallelism with said sheet and united thereto.

15. In the manufacture of structures of the character described, the method which comprises supporting a sheet-like foraminous metal body in parallel spaced relation to a backing plate provided with mounting means, and weld-uniting said foraminous metal body to said mounting means.

16. In the manufacture of electrode structures, the method which comprises providing a backing plate with a plurality of projecting stud devices arranged in the peripheral outline of an electrode member, and then weld-uniting such electrode member marginally to the outer ends of said stud devices.

17. In the manufacture of electrode structures, the method which comprises providing a backing plate with a plurality of projecting stud devices, holding said plate and a foraminous electrode member in parallel spaced relation with the periphery of said electrode member adjacent the outer ends of said stud devices, and weld-uniting said periphery with said outer ends.

18. In a structure of the character described, the combination, with a relatively thin backing plate, of stud devices anchored to said plate, each stud having a shoulder abutting against one face of said plate and having a portion riveted, calked or peened against the other face of the plate, some of the studs being riveted against one face and some against the other to lessen the tendency to warp said plate.

19. In an electrode structure, the combination, with a substantially plane supporting plate, of metal devices mounted at intervals on said plate and projecting substantially perpendicularly and approximately the same distance therefrom, and a metal member marginally united to the said devices.

20. In the manufacture of structures of the character described, the method which comprises supporting a sheet-like foraminous metal body in parallel relation to a backing plate having mounting means projecting from said plate, and uniting said foraminous metal body to said mounting means in spaced relation to the plate.

21. In a structure of the character described, the combination, with a foraminous metal sheet, and a metallic supporting plate, of one or more flat metallic strips secured to and disposed between said foraminous metal sheet and the plate and in electrical contact with the sheet and plate.

22. In a structure of the character described, the combination, with a foraminous metal sheet, and a supporting plate, of one or more flat strips secured to and underlying said sheet, and means secured to and disposed between said plate and said strips to maintain the strips in proper spaced relation to said plate.

23. In a structure of the character described, the combination, with a foraminous metal sheet, a supporting plate, and means marginally attaching said sheet to said plate in parallel spaced relation thereto, of studs each secured at one end to said plate and having the other end welded to said foraminous metal sheet said studs being located intermediate opposite margins of the sheets and maintaining that portion of the sheet in spaced relation to the plate.

In testimony whereof I hereunto affix my signature.

WILLIAM G. ALLAN.